US006951116B2

(12) United States Patent
Lee et al.

(10) Patent No.: US 6,951,116 B2
(45) Date of Patent: Oct. 4, 2005

(54) AIR CONDITIONER AND METHOD FOR CONTROLLING ELECTRONIC EXPANSION VALVE OF AIR CONDITIONER

(75) Inventors: Won Hee Lee, Seoul (KR); Cheol Min Kim, Kyungki-do (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 10/661,608

(22) Filed: Sep. 15, 2003

(65) Prior Publication Data

US 2004/0107715 A1 Jun. 10, 2004

(30) Foreign Application Priority Data

Nov. 22, 2002 (KR) .................................. 10-2002-0073107

(51) Int. Cl.[7] .................................................. F25B 7/00
(52) U.S. Cl. ........................ 62/175; 62/225; 62/228.5; 236/1 EA
(58) Field of Search .......................... 62/175, 223, 225, 62/228.5, 160; 236/1 EA

(56) References Cited

U.S. PATENT DOCUMENTS

| | | | | |
|---|---|---|---|---|
| 5,628,201 A | * | 5/1997 | Bahel et al. .................. | 62/211 |
| 6,276,148 B1 | * | 8/2001 | Shaw .......................... | 62/117 |
| 6,321,549 B1 | * | 11/2001 | Reason et al. ................ | 62/223 |
| 6,564,565 B2 | * | 5/2003 | Hwang ........................ | 62/210 |

FOREIGN PATENT DOCUMENTS

JP     10318612 A  * 12/1998  ............. F25B/1/00

* cited by examiner

*Primary Examiner*—Marc Norman
(74) *Attorney, Agent, or Firm*—Greenblum & Bernstein, P.L.C.

(57) ABSTRACT

Disclosed are an air conditioner in which one or more compressors are operated so that the refrigerant compression capacity of the operating compressor(s) is variably changed in accordance with a cooling or heating load for cooling or heating air in a room, and a method for controlling an electronic expansion valve of the air conditioner. The air conditioner comprises a plurality of compressors for compressing a refrigerant; a condenser for condensing the refrigerant; an electronic expansion valve for expanding the refrigerant; an evaporator for evaporating the refrigerant; a direction change valve for changing the flow direction of the refrigerant; a refrigerant pipe for connecting the compressors, the condenser, the electronic expansion valve, the evaporator and the direction change valve; and a microcomputer for controlling the operation of the air conditioner, wherein an opening degree of the electronic expansion valve is controlled so that a current degree of superheat coincides with a target degree of superheat set in consideration of the refrigerant compression capacity of operating compressor(s) and an outdoor temperature. The air conditioner prevents the refrigerant in a liquid state from being introduced into the compressor(s) and the compressor(s) from overheating, and rapidly eliminates the cooling or heating load.

18 Claims, 5 Drawing Sheets

AIR CONDITIONER AND METHOD FOR CONTROLLING ELECTRONIC EXPANSION VALVE OF AIR CONDITIONER

BACKGROUND OF THE INVENTION

1. Field of the Invention

The present invention relates to an air conditioner for cooling or heating air in a room and a method for controlling an electronic expansion valve of the air conditioner.

2. Description of the Related Art

Generally, an air conditioner is an appliance for cooling or heating an indoor space, such as a residential space, a restaurant, an office room, or etc. The air conditioner comprises a compressor for compressing a refrigerant into a high-temperature and high-pressure gaseous state, a condenser for condensing the refrigerant passing through the compressor into a high-temperature and high-pressure liquid state, an expansion device for decompressing the refrigerant passing through the condenser into a low-temperature and low-pressure liquid state, and an evaporator for evaporating the refrigerant passing through the expansion device into a low-temperature and low-pressure gaseous state. The compressor, the condenser, the expansion device, and the evaporator are connected by a refrigerant pipe. The operation of such an air conditioner is controlled by a microcomputer.

A heat pump-type air conditioner further comprises a direction change valve, such as a 3-way valve or a 4-way valve, adapted to change the flow direction of the refrigerant based on a cooling/heating function, thereby being selectively operated in a cooling or heating mode.

In the cooling mode of the air conditioner, an outdoor heat exchanger functions as the condenser, and an indoor heat exchanger functions as the evaporator. On the other hand, in the heating mode of the air conditioner, the outdoor heat exchanger functions as the evaporator, and the indoor heat exchanger functions as the condenser.

In the cooling mode, the air conditioner allows indoor air to pass through the indoor heat exchanger functioning as the evaporator, thereby discharging cold air to the room. In the heating mode, the air conditioner allows indoor air to pass through the indoor heat exchanger functioning as the condenser, thereby discharging warm air to the room.

A recently developed air conditioner employs an inverter-type compressor which can variably change its refrigerant compression capacity in accordance with a cooling or heating load in a room. Accordingly, it is possible to properly cope with the variation of the cooling or heating load, thereby optimizing the cooling or heating efficiency of the air conditioner.

Generally, a capillary tube or an electronic expansion valve may be used as the expansion device. The electronic expansion valve is mainly used as the expansion device for adjusting the flow rate of the refrigerant so that the cooling or heating capacity of the air conditioner can be variably changed.

Here, an opening degree of the electronic expansion valve is controlled so that a current degree of superheat obtained from a difference between a refrigerant temperature at an inlet of the compressor and a refrigerant temperature at the evaporator coincides with a predetermined target degree of superheat.

Of course, a table, which includes target degrees of superheat in accordance with the refrigerant compression capacities of the compressor, is stored in the microcomputer in advance.

When a user selects one of the cooling and heating modes and sets a desired target temperature, the compressor is operated such that the refrigerant compression capacity of the compressor is variably changed in accordance with a cooling or heating load determined by a difference between the target temperature and a room temperature. A current degree of superheat is measured, and a target degree of superheat is calculated according to the refrigerant compression capacity of the compressor. The opening degree of the electronic expansion device is controlled so that the current degree of superheat coincides with the target degree of superheat, thereby allowing the flow rate of the refrigerant to be controlled. Under this condition, the refrigerant passes through the compressor, the condenser, the electronic expansion valve, and the evaporator, thus allowing the air conditioner to achieve a cooling or heating function.

Recent air conditioners have increased in size, thus requiring a plurality of compressors. In this case, one or more compressors are selectively operated so that the total refrigerant compression capacity of the operating compressors is variably changed. Accordingly, the opening degree of the electronic expansion valve must be controlled so that the flow rate of the refrigerant is variably changed in consideration of the total refrigerant compression capacity.

Here, when the flow rate of the refrigerant, i.e., a refrigerant circulation capacity, is smaller than the refrigerant compression capacity, the compressors are overheated. When the flow rate of the refrigerant is larger than the refrigerant compression capacity, the refrigerant in a liquid state is introduced into the compressors, thus causing failure of the compressors and a limit of improving the cooling or heating efficiency of the air conditioner.

In case that an outdoor temperature is high in the cooling mode of the air conditioner, heat is transmitted to the outdoor heat exchanger serving as a condenser in outdoor air, thereby increasing the cooling load. In case that the outdoor temperature is high in the heating mode of the air conditioner, heat is transmitted to the outdoor heat exchanger serving as an evaporator in outdoor air, and the temperature of the refrigerant passed through the outdoor heat exchanger and the temperature of the refrigerant introduced into the compressors after it passes through the outdoor heat exchanger are comparatively increased, thereby causing the compressors to overheat. Thus, the opening degree of the electronic expansion valve must be controlled in consideration of the outdoor temperature.

Accordingly, in order to control the opening degree of the electronic expansion valve in consideration of the total refrigerant compression capacity in the air conditioner comprising the plural compressors, the current degree of superheat must be measured and the target degree of superheat must be set in consideration of the total refrigerant compression capacity and the outdoor temperature. Further, the opening degree of the electronic expansion valve must be controlled so that the current degree of superheat coincides with the target degree of superheat.

SUMMARY OF THE INVENTION

Therefore, the present invention has been made in view of the above problems, and it is an object of the present invention to provide an air conditioner, in which one or more compressors are operated so that the total refrigerant compression capacity is variably controlled in accordance with a cooling or heating load in a room, and an opening degree of an electronic expansion valve is controlled so that the flow rate of the refrigerant is adjusted, thus rapidly eliminating the cooling or heating load.

It is another object of the present invention to provide a method for controlling an electronic expansion valve of an air conditioner, in which an opening degree of the electronic expansion valve is controlled so that a current degree of superheat coincides with a target degree of superheat set in consideration of the total refrigerant compression capacity of the operating compressors and an outdoor temperature during the operation of one or more compressors in accordance with a cooling or heating load, thus rapidly eliminating the cooling or heating load and increasing the reliability of the compressors.

In accordance with one aspect of the present invention, the above and other objects can be accomplished by the provision of an air conditioner comprising: a plurality of compressors for compressing a refrigerant; a condenser for condensing the refrigerant; an electronic expansion valve for expanding the refrigerant; an evaporator for evaporating the refrigerant; a direction change valve for changing the flow direction of the refrigerant; a refrigerant pipe for connecting the compressors, the condenser, the electronic expansion valve, the evaporator and the direction change valve; and a microcomputer for controlling the operation of the air conditioner, wherein the microcomputer controls an opening degree of the electronic expansion valve so that a current degree of superheat coincides with a target degree of superheat set according to the refrigerant compression capacity of operating compressor(s) and an outdoor temperature in case that one or more compressors are operated so that the refrigerant compression capacity is variably changed in accordance with a cooling or heating load.

Preferably, the air conditioner may further comprise a first temperature sensor, installed at inlets of the compressors, for measuring the temperature of the refrigerant sucked into the compressors; a second temperature sensor, installed at the evaporator, for measuring the temperature of the refrigerant passing through the evaporator; and a third temperature sensor, installed outdoors, for measuring the outdoor temperature, wherein the microcomputer sets a difference between the temperature of the refrigerant at the inlets of the compressors measured by the first temperature sensor and the temperature of the refrigerant at the evaporator measured by the second temperature sensor as the current degree of superheat, and sets the target degree of superheat according to the refrigerant compression capacity of the operating compressor(s) and the outdoor temperature measured by the third temperature sensor.

Further, preferably, the plural compressors may include first and second compressors having different refrigerant compression capacities, and the refrigerant compression capacity of the first compressor may be larger than that of the second compressor.

Both of the first and second compressors are simultaneously operated, or only one of the first and second compressors is selectively operated, according to the cooling or heating load.

Preferably, the microcomputer may include tables storing the target degrees of superheat in accordance with the variation in the refrigerant compression capacity of the operating compressor(s) and the outdoor temperature.

In accordance with another aspect of the present invention, there is provided a method for controlling an electronic expansion valve of an air conditioner comprising the steps of: (a) operating one or more of a plurality of compressors so that the refrigerant compression capacity of the operating compressor(s) is variably changed according to a cooling/heating load; (b) calculating a current degree of superheat and simultaneously setting a target degree of superheat in accordance with the refrigerant compression capacity of the operating compressor(s) and an outdoor temperature in case that one or more of the plural compressors are operated at the step (a); and (c) controlling an opening degree of the electronic expansion valve so that the current degree of superheat calculated at the step (b) coincides with the target degree of superheat.

Preferably, the step (a) may include the step of determining whether a first compressor having a refrigerant compression capacity of X % of the total refrigerant compression capacity and a second compressor having a refrigerant compression capacity of (100−X)% of the total refrigerant compression capacity are simultaneously or selectively operated. The step (a) may further include the step of operating the first and second compressors simultaneously according to the cooling or heating load, or the step of operating only one of the first and second compressors selectively, according to the cooling or heating load.

Further, preferably, the current degree of superheat at the step (b) may be calculated from a difference between a temperature of the refrigerant at inlets of the operating compressor(s) and a temperature of the refrigerant at an evaporator.

Moreover, preferably, the target degree of superheat set at the step (b) in case that first and second compressors are simultaneously operated in a cooling or heating mode at the step (a) may be set to be larger than the target degree of superheat set at the step (b) in case that one of the first and second compressors is selectively operated in the cooling or heating mode at the step (a).

Preferably, the target degree of superheat set at the step (b) in case that the outdoor temperature is not more than a first designated temperature in a cooling mode at the step (a) may be set to be smaller than the target degree of superheat set at the step (b) in case that the outdoor temperature is more than the first designated temperature in the cooling mode at the step (a).

More preferably, the target degree of superheat at the step (b) may be set to −2° C. in case that the first and second compressors are simultaneously operated in the cooling mode and the outdoor temperature is not more than 40° C. at the step (a), and set to −3° C. in case that the first and second compressors are simultaneously operated in the cooling mode and the outdoor temperature is more than 40° C. at the step (a).

Further, the target degree of superheat at the step (b) may be set to 0° C. in case that only one of the first and second compressors is selectively operated in the cooling mode and the outdoor temperature is not more than 40° C. at the step (a), and set to −1° C. in case that only one of the first and second compressors is selectively operated in the cooling mode and the outdoor temperature is more than 40° C. at the step (a).

Preferably, the target degree of superheat set at the step (b) in case that the outdoor temperature is not more than a second designated temperature in a heating mode at the step (a) may be set to be smaller than the target degree of superheat set at the step (b) in case that the outdoor temperature is more than the second designated temperature in the heating mode at the step (a). The step (b) may further include the step of simultaneously operating both of the first and second compressors in case that the outdoor temperature in the heating mode at the step (a) is not more than a third designated temperature lower than the second designated temperature.

More preferably, the target degree of superheat at the step (b) may be set to −1° C. in case that the first and second compressors are simultaneously operated in the heating mode and the outdoor temperature is not more than −4° C. at the step (a), set to −2° C. in case that the first and second compressors are simultaneously operated in the heating mode and the outdoor temperature is more than −4° C. and not more than 20° C. at the step (a), and set to −3° C. in case that the first and second compressors are simultaneously operated in the heating mode and the outdoor temperature is more than 20° C. at the step (a).

Further, the target degree of superheat at the step (b) may be set to 0° C. in case that only one of the first and second compressors is selectively operated in the heating mode and the outdoor temperature is not more than 20° C. at the step (a), and set to −1° C. in case that only one of the first and second compressors is selectively operated in the heating mode and the outdoor temperature is more than 20° C. at the step (a).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
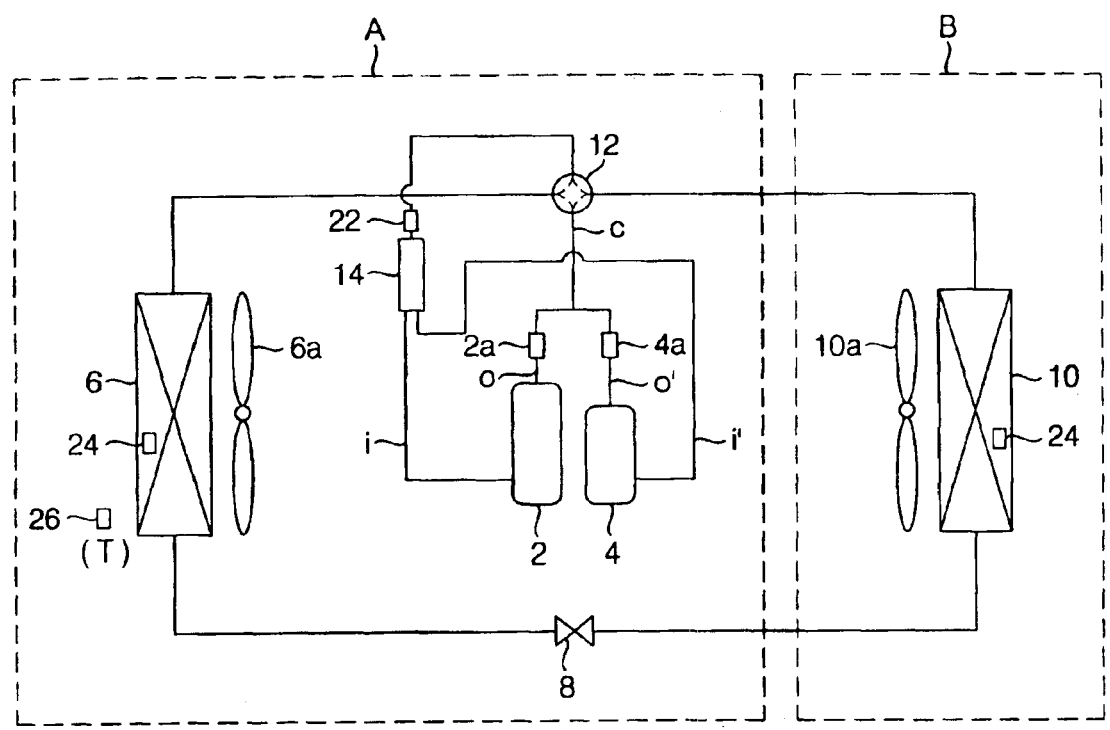
FIG. 1 is a schematic view of an air conditioner of the present invention.
Figure 2:
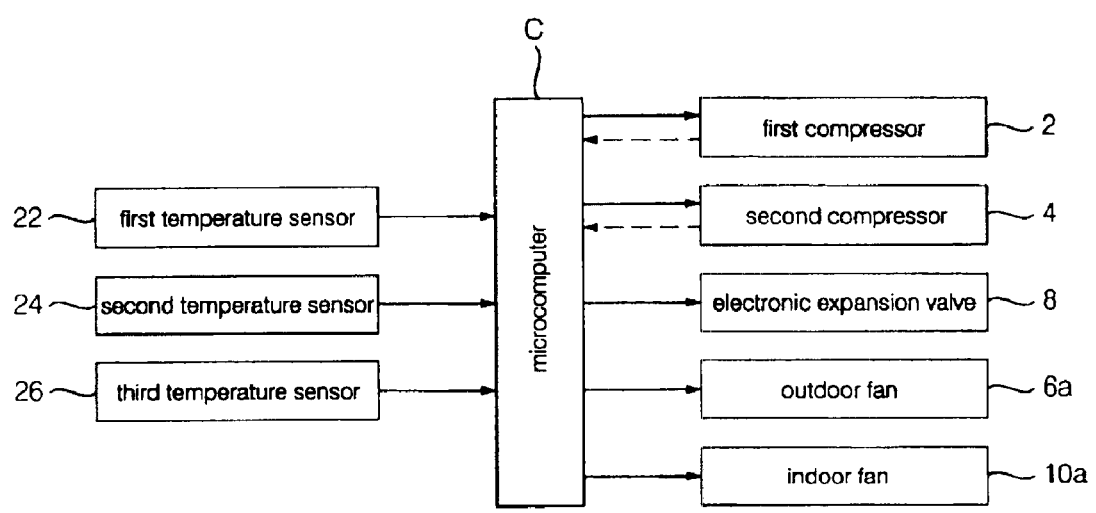
FIG. 2 is a block diagram of a microcomputer of the air conditioner of the present invention.

As shown in FIGS. 1 and 2, an air conditioner in accordance with the present invention comprises an outdoor unit (A) installed outdoors for compressing, condensing and expanding a refrigerant in a cooling mode, an indoor unit (B) installed indoors so as to be connected to the outdoor unit (A) by a refrigerant pipe for evaporating the refrigerant in the cooling mode, and a microcomputer (C) for controlling operations of compressors and an electronic expansion valve of the outdoor unit (A).

Here, the outdoor unit (A) includes first and second compressors 2 and 4, an outdoor heat exchanger 6, an outdoor fan 6a, an electronic expansion valve 8, an oil separation unit 14, and a refrigerant pipe, for connecting such components, provided with a plurality of check valves 2a and 4a installed therein. The indoor unit (B) includes an indoor heat exchanger 10 and an indoor fan 10a.

More specifically, outlet lines o and o' are connected to one of the ends of the first and second compressors 2 and 4, respectively. In order to prevent the backflow of the refrigerant into the first and second compressors 2 and 4, the first and second check valves 2a and 4a are installed in the outlet lines o and o'. A connection pipe c is connected to the outlet lines o and o' so that the refrigerants discharged via the two outlet lines o and o' are joined together therein and then guided to a condenser, an expansion device and an evaporator during an air conditioning cycle.

Inlet lines i and i' are branched from the end of the connection pipe c, and then connected to the first and second compressors 2 and 4 so as to guide the refrigerant to the first and second compressors 2 and 4. The oil separation unit 14 is positioned between the connection pipe c and the inlet lines i and i', and serves to separate oil discharged together with the refrigerant from the first and second compressors 2 and 4, to supply the separated oil to each of the first and second compressors 52 and 54, and to prevent the refrigerant from being introduced into the first and second compressors 2 and 4.

Here, a direction change valve 12 for selectively controlling the flow direction of the refrigerant is installed in the connection pipe c connected to the ends of the first and second check valves 2a and 4a. The direction change valve 12 allows the refrigerant compressed by the first and second compressors 2 and 4 to flow toward the outdoor heat exchanger 6, thereby forming a cooling cycle, or to flow toward the indoor heat exchanger 10, thereby forming a heating cycle.

The first and second compressors 2 and 4 have different refrigerant compression capacities respectively such that the refrigerant compression capacity of the first compressor 2 is X % of the total refrigerant compression capacity of the air conditioner and the refrigerant compression capacity of the second compressor 4 is (100−X)% of the total refrigerant compression capacity of the air conditioner. The refrigerant compression capacity of the first compressor 2 is larger than the refrigerant compression capacity of the second compressor 4. The first and second compressors 2 and 4 are simultaneously or selectively operated according to the cooling or heating load to be eliminated.

The electronic expansion valve 8 adjusts the opening degree of a passage through which the refrigerant passes, thereby controlling the flow rate of the refrigerant circulating through an air conditioning system. The opening degree of the electronic expansion valve 8 is controlled according to the cooling or heating load.

The outdoor fan 10a is installed adjacent to one side of the outdoor heat exchanger 10, and the indoor fan 6a is installed adjacent to one side of the indoor heat exchanger 6. Accordingly, the rotating speeds of the outdoor fan 10a and the indoor fan 6a are changed according to the variation of the cooling or heating load, thereby controlling the amount of circulation of outdoor air and indoor air, respectively.

The microcomputer (C) of the air conditioner controls the operation of the first and second compressors 2 and 4, the opening degree of the electronic expansion valve 8, and the rotating speeds of the outdoor and indoor fans 6a and 10a. Particularly, the microcomputer (C) of the air conditioner controls the operations of the first and second compressors 2 and 4, the electronic expansion valve 8 and the outdoor and indoor fans 6a and 10a so that a current degree of superheat reaches a target degree of superheat.

Here, the air conditioner comprises a first temperature sensor 22, installed at the inlet lines i and i' of the first and second compressor 2 and 4 for measuring the temperature of the refrigerant sucked into the operating compressor(s) in order to measure the current degree of superheat, a second temperature sensor 24 installed at the refrigerant pipe of the indoor heat exchanger 10 or the outdoor heat exchanger 9 for measuring the temperature of the refrigerant passing through the heat exchanger serving as the evaporator in the cooling or heating mode, and a third temperature sensor 26, installed outdoors for measuring an outdoor temperature.

The microcomputer (C) calculates the current degree of superheat by a difference between the temperature of the refrigerant at the inlet lines i and i' of the first and second compressors 2 and 4 measured by the first temperature sensor 22 and the temperature of the refrigerant at the evaporator measured by the second temperature sensor 24. Then, the microcomputer (C) sets the target degree of superheat in accordance with the total refrigerant compression capacity of the operating compressors and the outdoor temperature measured by the third temperature sensor 26.

The microcomputer (C) stores a table, which includes target degrees of superheat in accordance with refrigerant compression capacities and outdoor temperatures.

More specifically, the target degree of superheat is obtained from the below tables 1 and 2. The tables 1 and 2 contain target degrees of superheat designated according to outdoor temperatures when the first compressor with the refrigerant compression capacity of X % and the second compressor with the refrigerant compression capacity of (100−X)% are simultaneously operated, or when only the second compressor is operated, in accordance with the outdoor temperature.

TABLE 1

| | Cooling mode | |
| --- | --- | --- |
| Outdoor temperature (T) | Operate first and second compressors (100%) | Operate second compressor (100 − X %) |
| Not more than 40° C. | −2° C. | 0° C. |
| More than 40° C. | −3° C. | −1° C. |

TABLE 2

| | Heating mode | |
| --- | --- | --- |
| Outdoor temperature (T) | Operate first and second compressors (100%) | Operate second compressor (100 − X %) |
| Not more than −4° C. | −1° C. | — |
| −4° C.~20° C. | −2° C. | 0° C. |
| More than 20° C. | −3° C. | −1° C. |

Hereinafter, with reference to Table 1, a process for setting a target degree of superheat in the cooling mode of the air conditioner will be described. When the first and second compressors 2 and 4 are simultaneously operated in accordance with a cooling load, in case that the outdoor temperature (T) is not more than 40° C., the target degree of superheat is set to −2° C. On the other hand, in case that the outdoor temperature (T) is more than 40° C., the target degree of superheat is set to −3° C.

That is, when the outdoor temperature (T) is higher in the cooling mode, heat is transmitted from outdoor air to the outdoor heat exchanger 6 serving as a condenser so that an actual cooling load is increased. Then, in order to increase the flow rate of the refrigerant for rapidly eliminating the increased cooling load, the target degree of superheat is adjusted to be higher.

The target degree of superheat in case that the cooling load is decreased and then only the second compressor 4 is operated, is set to be higher than the target degree of superheat in case that the first and second compressors 2 and 4 are simultaneously operated, by 2° C.

That is, the refrigerant compression capacity in case that only the second compressor 4 is operated, is smaller than the refrigerant compression capacity in case that the first and second compressors 2 and 4 are simultaneously operated, thus allowing the target degree of superheat in case that only the second compressor 4 is operated to be decreased so that the flow rate is decreased in proportion to the smaller refrigerant compression capacity.

On the other hand, with reference to Table 2, a process for setting a target degree of superheat in the heating mode of the air conditioner will be described. When the first and second compressors 2 and 4 are simultaneously operated in accordance with a heating load, in case that the outdoor temperature (T) is not more than −4° C., the target degree of superheat is set to −1° C. In case that the outdoor temperature (T) is more than −4° C. and not more than 20° C., the target degree of superheat is set to −2° C. Further, in case that the outdoor temperature (T) is more than 20° C., the target degree of superheat is set to −3° C.

That is, when the outdoor temperature (T) is higher in the heating mode, heat is transmitted from outdoor air to the outdoor heat exchanger 6 serving as an evaporator so that the temperature of the refrigerant passing through the outdoor heat exchanger 6 is comparatively increased. Thereby, the temperature of the refrigerant introduced into the first and second compressors 2 and 4 after it passes through the outdoor heat exchanger 6 is also increased. Accordingly, in order to prevent the first and second compressors 2 and 4 from overheating, the target degree of superheat is adjusted to be higher so that the flow rate of the refrigerant is increased.

The target degree of superheat in case that the heating load is decreased and then only the second compressor 4 is operated, is set to be higher than the target degree of superheat in case that the first and second compressors 2 and 4 are simultaneously operated, by 2° C.

That is, the refrigerant compression capacity in case that only the second compressor 4 is operated, is smaller than the refrigerant compression capacity in case that the first and second compressors 2 and 4 are simultaneously operated, thus allowing the target degree of superheat in case that only the second compressor 4 is operated to be decreased so that the flow rate is decreased in proportion to the smaller refrigerant compression capacity.

In case that only the second compressor 4 is operated, when the outdoor temperature (T) is not more than −4° C., the outdoor heat exchanger 6 serving as the evaporator is frosted due to the small refrigerant compression capacity and the low outdoor temperature. In this case, since the air conditioner is operated in a defrosting mode in order to heat the fronted outdoor heat exchanger 6, it is unnecessary to set the target degree of superheat.

Figure 3:
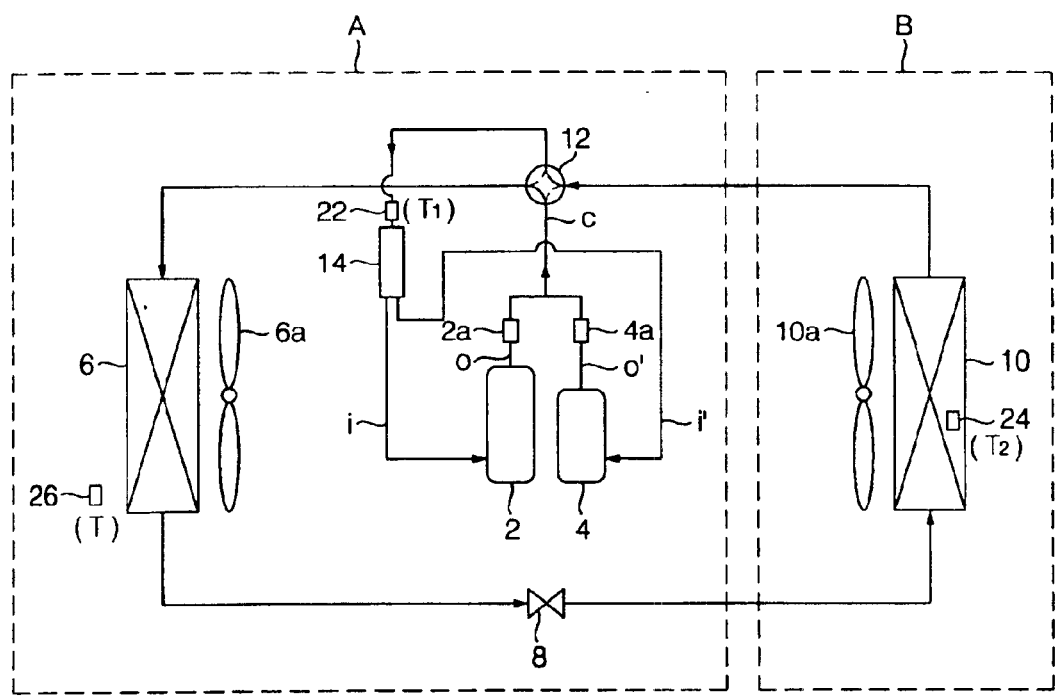
FIG. 3 is a schematic view of a refrigerant flow in a cooling mode of the air conditioner of the present invention.
Figure 4:
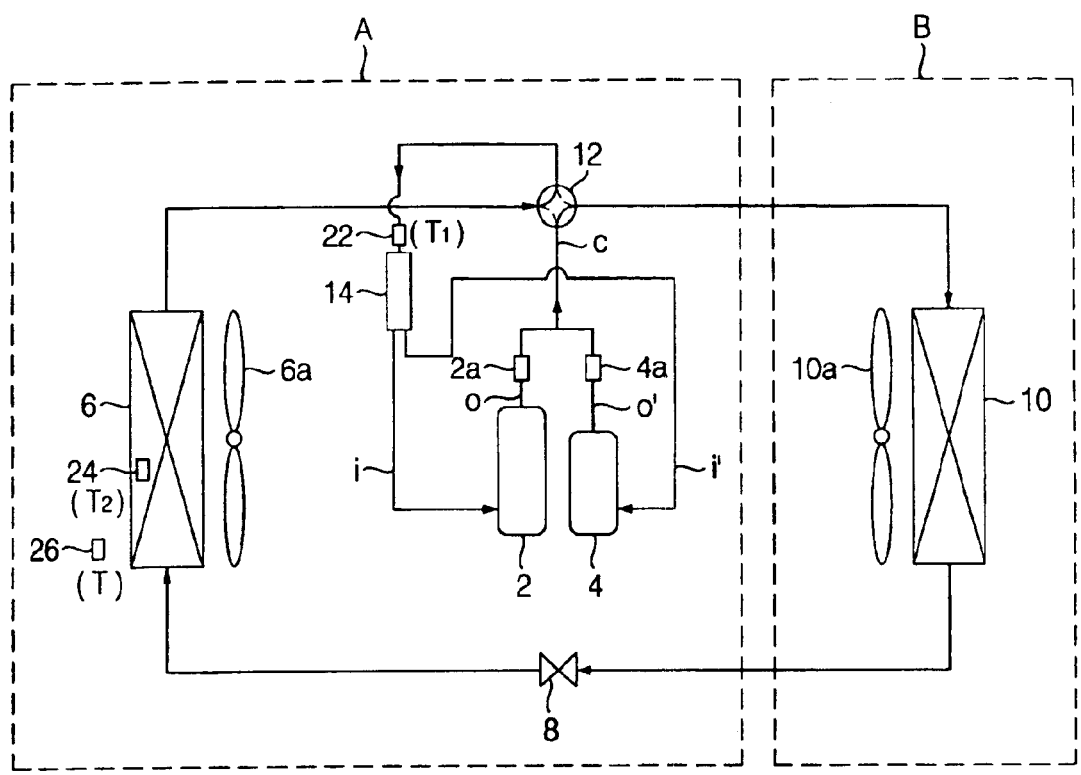
FIG. 4 is a schematic view of a refrigerant flow in a heating mode of the air conditioner of the present invention.
Figure 5:
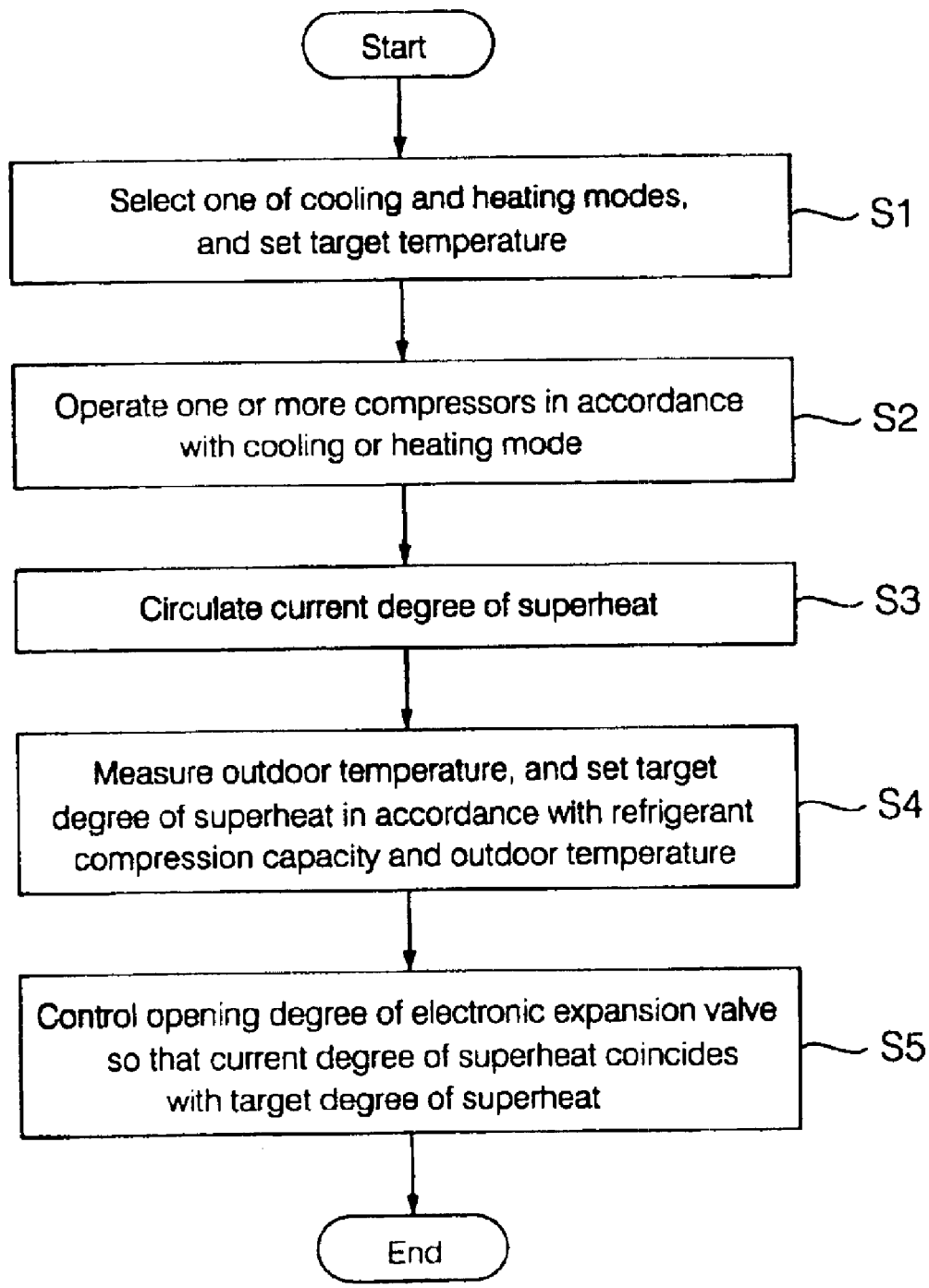
FIG. 5 is a flow chart illustrating a method for controlling an electronic expansion valve of the air conditioner of the present invention.

Hereinafter, with reference to FIGS. 3 to 5, a method for controlling the operation of the above-described air conditioner will be described in detail.

First, a user selects one of cooling and heating modes, and sets a desirable target temperature. Then, one or both of the first and second compressors 2 and 4 are operated in accordance with a cooling or heating load to be eliminated in a room (S1 and S2).

Here, in case that the cooling mode is selected by the user, the outdoor heat exchanger 6 functions as a condenser and the indoor heat exchanger 10 functions as an evaporator. The direction change valve 12 guides the refrigerant exhausted from the first and second compressors 2 and 4 to the outdoor heat exchanger 6 so that the refrigerant circulates through the first and second compressors 2 and 4, the outdoor heat exchanger 6, the electronic expansion valve 8, and the indoor heat exchanger 10, sequentially.

On the other hand, in case that the heating mode is selected by the user, the outdoor heat exchanger 6 functions as an evaporator and the indoor heat exchanger 10 functions as a condenser. The direction change valve 12 guides the refrigerant exhausted from the first and second compressors 2 and 4 to the indoor heat exchanger 10 so that the refrigerant circulates through the first and second compressors 2 and 4, the indoor heat exchanger 10, the electronic expansion valve 8, and the outdoor heat exchanger 6, sequentially.

Here, the cooling or heating load is determined by the difference between a room temperature and the target temperature set by the user. In order to rapidly eliminate the cooling or heating load, the first and second compressors 2 and 4 are simultaneously operated at an initial stage. However, after a part of the cooling or heating load is eliminated by the simultaneous operation of the first and second compressors 2 and 4, only the second compressor 4 may be operated.

Second, in case that one or both of the first and second compressors 2 and 4 are operated, a current degree of superheat is calculated (S3).

Here, the temperature ($T_1$) of the refrigerant at the inlets i and i' of the first and second compressors 2 and 4 is measured by the first temperature sensor 22 installed at the inlets i and i' of the first and second compressors 2 and 4, the temperature ($T_2$) of the refrigerant at the evaporator is measured by the second temperature sensor 24 installed at the indoor heat exchanger 10 serving as the evaporator in the cooling mode, and the temperature (T) of the refrigerant at the evaporator is measured by the third temperature sensor 26 installed at the outdoor heat exchanger 6 serving as the evaporator in the heating mode.

When the temperatures ($T_1$ and $T_2$) measured by the first and second temperature sensors 22 and 24 are inputted into the microcomputer (C), the microcomputer (C) calculates the difference between the temperature ($T_1$) of the refrigerant at the inlets i and i' of the first and second compressors 2 and 4 and the temperature ($T_2$) of the refrigerant at the evaporator, thereby recognizing the obtained difference as the current degree of superheat.

Third, after the current degree of superheat is calculated, the outdoor temperature (T) is measured, and then a target degree of superheat is set according to the refrigerant compression capacity and the outdoor temperature (T) (S4).

Here, the outdoor temperature (T) is measured by the third temperature sensor 26 installed outdoors. When the refrigerant compression capacity of the operating compressor(s) and the outdoor temperature (T) are inputted into the microcomputer (C), the microcomputer (C) obtains the target degree of superheat according to the refrigerant compression capacity and the outdoor temperature (T) from a table stored in the microcomputer (C) in advance.

More specifically, the larger the refrigerant compression capacity is and the higher the outdoor temperature (T) is, the larger the target degree of superheat is.

Fourth, the opening degree of the electronic expansion valve 8 is controlled so that the current degree of superheat calculated at the step (S3) coincides with the target degree of superheat set at the step (S4) (S5).

Generally, the opening degree of the electronic expansion valve 8 has a value in the range of 0~510 pulse. In case that the opening degree of the electronic expansion valve 8 is 0 pulse, the refrigerant passage of the electronic expansion valve 8 is closed. On the other hand, in case that the opening degree of the electronic expansion valve 8 is 510 pulse, the refrigerant passage of the electronic expansion valve 8 is completely opened. The microcomputer (C) changes the opening degree of the electronic expansion valve 8 in accordance with the refrigerant compression capacity and the outdoor temperature (T), thereby controlling the flow rate of the circulating refrigerant so that the air conditioner rapidly copes with the variation in the cooling or heating load.

The microcomputer (C) controls the operation of the first and second compressors 2 and 4 and the rotating speeds of the outdoor and indoor fans 6a and 10a as well as the opening degree of the electronic expansion valve 8 so that the current degree of superheat coincides with the target degree of superheat.

Since the microcomputer (C) operates one or both of the first and second compressors 2 and 4 in accordance with the cooling or heating load and controls the opening degree of the electronic expansion valve 8 so that the current degree of superheat coincides with the target degree of superheat set in consideration of the refrigerant compression capacity and the outdoor temperature, the microcomputer (C) variably changes the refrigerant compression capacity in accordance with the cooling or heating load and adjusts the flow rate of the refrigerant in accordance with the refrigerant compression capacity and the outdoor temperature, thereby allowing the air conditioner to rapidly eliminate the cooling or heating load.

The apparatus and the method for controlling the operation of the air conditioner in accordance with the present invention have several advantages, as follows.

First, since the air conditioner of the present invention comprises a plurality of compressors in which one or more compressors are operated according to a cooling or heating load in a cooling or heating mode so that the total refrigerant compression capacity of the operating compressor(s) can be variably changed, and a microcomputer for controlling the opening degree of an electronic expansion valve so that a current degree of superheat coincides with a target degree of superheat set according to the refrigerant compression capacity and the outdoor temperature, the air conditioner variably changes the refrigerant compression capacity in consideration of the cooling or heating load and controls the flow rate of the refrigerant in consideration of the refrigerant compression capacity and the outdoor temperature, thereby rapidly eliminating the cooling or heating load.

Second, the method for controlling the operation of the air conditioner of the present invention comprises steps of measuring a current degree of superheat under the condition in which one or more compressor(s) are operated so that the refrigerant compression capacity of the operating compressor(s) is variably changed in accordance with the cooling or heating load, calculating a target degree of superheat in accordance with the refrigerant compression capacity and an outdoor temperature, and controlling the opening degree of the electronic expansion valve for adjusting the flow rate of the refrigerant so that the current degree of superheat coincides with the target degree of superheat, thereby preventing the operating compressor(s) from overheating in case that the flow rate of the refrigerant is smaller than the refrigerant compression capacity and preventing the refrigerant in a liquid state from being introduced into the operating compressor(s) in case that the flow rate of the refrigerant is larger than the refrigerant compression capacity. Accordingly, it is possible to improve the reliability of the compressors.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air conditioner comprising:
   a plurality of compressors for compressing a refrigerant;
   a condenser for condensing the refrigerant;
   an electronic expansion valve for expanding the refrigerant;
   an evaporator for evaporating the refrigerant;
   a direction changing valve for changing a flow direction of the refrigerant;
   a refrigerant conduit for connecting the plurality of compressors, the condenser, the electronic expansion valve, the evaporator and the direction changing valve; and
   a first temperature sensor, installed at inlets of the compressors, for measuring a temperature of the refrigerant drawn into the compressors;
   a second temperature sensor, installed at the evaporator, for measuring a temperature of the refrigerant passing through the evaporator;
   a third temperature sensor, installed outdoors, for measuring an outdoor temperature; and
   a microcomputer for controlling operation of the air conditioner,
   wherein the microcomputer controls an opening degree of the electronic expansion valve so that a current degree of superheat coincides with a target degree of superheat set according to the refrigerant compression capacity of at least one operating compressor and an outdoor temperature when at least one compressor is operated so that the refrigerant compression capacity is varied in accordance with a one of a cooling load and a heating load,
   wherein the microcomputer sets a difference between the temperature of the refrigerant at the inlets of the compressors measured by the first temperature sensor and the temperature of the refrigerant at the evaporator measured by the second temperature sensor as a current degree of superheat, and sets the target degree of superheat according to the refrigerant compression capacity of the at least one operating compressor and the outdoor temperature measured by the third temperature sensor.

2. The air conditioner as set forth in claim 1,
   wherein the plural compressors include at least first and second compressors having different refrigerant compression capacities.

3. The air conditioner as set forth in claim 2,
   wherein the refrigerant compression capacity of the first compressor is larger than that of the second compressor.

4. The air conditioner as set forth in claim 3,
   wherein both of the first and second compressors are concurrently operated, or only one of the first and second compressors is selectively operated, according to one of the cooling load and heating load.

5. The air conditioner as set forth in claim 4,
   wherein the microcomputer includes tables storing the target degrees of superheat in accordance with a variation in the refrigerant compression capacity of the at least one operating compressor and the outdoor temperature.

6. A method for controlling an electronic expansion valve of an air conditioner comprising:
   operating at least one of a plurality of compressors so that a refrigerant compression capacity of the at least one operating compressor is varied according to a cooling/heating load;
   calculating a current degree of superheat and setting a target degree of superheat in accordance with the refrigerant compression capacity of the at least one operating compressor and an outdoor temperature when at least one of the plural compressors is operated; and
   controlling an opening degree of the electronic expansion valve so that the current degree of superheat calculated coincides with the target degree of superheat.
   wherein the operating comprises determining whether a first compressor, having a refrigerant compression capacity of X% of the total refrigerant compression capacity, and a second compressor, having a refrigerant compression capacity of (100−X)% of the total refrigerant compression capacity, are concurrently or selectively operated.

7. The method as set forth in claim 6,
   wherein the operating further includes operating the first and second compressors concurrently according to one of the cooling load and the heating load, or selectively operating only one of the first and second compressors, according to one of the cooling load and the heating load.

8. The method as set forth in claim 6,
   wherein the calculating comprises calculating the current degree of superheat based upon a difference between a temperature of the refrigerant at inlets of the at least one operating compressor and a temperature of the refrigerant at an evaporator.

9. The method as set forth in claim 6,
   wherein the calculated target degree of superheat when the first and second compressors are concurrently operated in one of a cooling mode and a heating mode is set to be larger than the target degree of superheat set when one of the first and second compressors is selectively operated in one of the cooling mode and the heating mode.

10. The method as set forth in claim 9,
    wherein the calculated target degree of superheat when the outdoor temperature is not more than a first designated temperature in a cooling mode of operation is set to be smaller than the target degree of superheat set when the outdoor temperature is more than the first designated temperature in the cooling mode of operation.

11. The method as set forth in claim 10,
    wherein the calculated target degree of superheat is set to −2° when the first and second compressors are concurrently operated in the cooling mode and the outdoor temperature is not more than 40° C., and is set to −3° C. when the first and second compressors are concurrently operated in the cooling mode and the outdoor temperature is more than 40° C.

12. The method as set forth in claim 11,
wherein the calculated target degree of superheat is set to 0° C. when only one of the first and second compressors is selectively operated in the cooling mode and the outdoor temperature is not more than 40° C., and is set to −1° C. when only one of the first and second compressors is selectively operated in the cooling mode and the outdoor temperature is more than 40° C.

13. The method as set forth in claim 9,
wherein the calculated target degree of superheat when the outdoor temperature is not more than a first predetermined temperature in a heating mode of operation is set to be smaller than the target degree of superheat set when the outdoor temperature is more than the first predetermined temperature in the heating mode of operation.

14. The method as set forth in claim 13,
wherein the calculating further includes concurrently operating both of the first and second compressors when the outdoor temperature in the heating mode of operation is not more than a second predetermined temperature lower than the first predetermined temperature.

15. The method as set forth in claim 14,
wherein the calculated target degree of superheat is set to −1° C. when the first and second compressors are a concurrently operated in the heating mode of operation and the outdoor temperature is not more than −4° C., is set to −2° C. when the first and second compressors are concurrently operated in the heating mode of operation and the outdoor temperature is more than −4° C. and not more than 20° C., and is set to −3° C. when the first and second compressors are simultaneously operated in the heating mode of operation and the outdoor temperature is more than 20° C.

16. The method as set forth in claim 15,
wherein the calculated target degree of superheat is set to 0° C. when one of the first and second compressors is selectively operated in the heating mode and the outdoor temperature is not more than 20° C., and is set to −1° C. when one of the first and second compressors is selectively operated in the heating mode and the outdoor temperature is more than 20° C.

17. A method for controlling an electronic expansion valve of an air conditioner comprising:

operating at least one of a plurality of compressors so that the refrigerant compression capacity of the at least one operating compressor is changed according to a cooling/heating load;

calculating a current degree of superheat and setting a target degree of superheat in accordance with the refrigerant compression capacity of the at least one operating compressor and an outdoor temperature when at least one of the plural compressors is operated; and controlling an opening degree of the electronic expansion valve so that the current degree of superheat calculated coincides with the target degree of superheat, wherein the calculated target degree of superheat when the first and second compressors are concurrently operated in one of a cooling mode and a heating mode is set to be larger than the target degree of superheat set when one of the first and second compressors is selectively operated in one of the cooling mode and the heating mode.

18. The method as set forth in claim 17,
wherein the calculated target degree of superheat when the outdoor temperature is not more than a first designated temperature in a cooling mode of operation is set to be smaller than the target degree of superheat set when the outdoor temperature is more than the first designated temperature in the cooling mode of operation.

* * * * *

UNITED STATES PATENT AND TRADEMARK OFFICE
CERTIFICATE OF CORRECTION

| | | |
|---|---|---|
| PATENT NO. | : 6,951,116 B2 | Page 1 of 1 |
| APPLICATION NO. | : 10/661608 | |
| DATED | : October 4, 2005 | |
| INVENTOR(S) | : W. H. Lee et al. | |

It is certified that error appears in the above-identified patent and that said Letters Patent is hereby corrected as shown below:

Column 13,
Line 27, after "are" delete "a".

Signed and Sealed this

Twentieth Day of June, 2006

JON W. DUDAS
*Director of the United States Patent and Trademark Office*